(12) United States Patent
Scherle et al.

(10) Patent No.: US 10,844,897 B2
(45) Date of Patent: Nov. 24, 2020

(54) FLEXIBLE SHAFT WITH A CATCH AND METHOD FOR PRODUCING A FLEXIBLE SHAFT WITH A CATCH

(71) Applicant: Küster Holding GmbH, Ehringshausen (DE)

(72) Inventors: Artur Scherle, Wetzlar-Münchholzhausen (DE); Günter Reinhardt, Wehrdorf (DE); Markus Eckhardt, Mittenaar-Offenbach (DE)

(73) Assignee: Küster Holding GmbH, Ehringshausen (DE)

( * ) Notice: Subject to any disclaimer, the term of this patent is extended or adjusted under 35 U.S.C. 154(b) by 31 days.

(21) Appl. No.: 16/070,928

(22) PCT Filed: Mar. 1, 2017

(86) PCT No.: PCT/EP2017/054690
§ 371 (c)(1),
(2) Date: Jul. 18, 2018

(87) PCT Pub. No.: WO2017/157655
PCT Pub. Date: Sep. 21, 2017

(65) Prior Publication Data
US 2019/0024701 A1    Jan. 24, 2019

(30) Foreign Application Priority Data
Mar. 16, 2016   (DE) .................. 10 2016 104 918

(51) Int. Cl.
*F16C 1/14* (2006.01)
*F16C 1/20* (2006.01)
*B60J 7/057* (2006.01)

(52) U.S. Cl.
CPC ............. *F16C 1/145* (2013.01); *B60J 7/0573* (2013.01); *F16C 1/20* (2013.01); *F16C 2226/60* (2013.01)

(58) Field of Classification Search
CPC ........ F16C 1/145; F16C 1/20; F16C 2226/60; B60J 7/0573
(Continued)

(56) References Cited

U.S. PATENT DOCUMENTS

| 3,444,701 A | 5/1969 | Randolph |
| 4,038,881 A | 8/1977 | Conrad |

(Continued)

FOREIGN PATENT DOCUMENTS

| DE | 7306032 U | 5/1973 |
| DE | 2418110 | 4/1974 |

(Continued)

OTHER PUBLICATIONS

European Patent Office Search Report dated Sep. 9, 2019 in respect of EP App. 19172315.4.

*Primary Examiner* — David H Bollinger
(74) *Attorney, Agent, or Firm* — Rogowski Law LLC

(57) ABSTRACT

The invention relates to a flexible shaft (1) with a spiral coil (3) arranged on a core (2) of the cable (1) and with a catch (4) arranged at one of the cable ends for transmitting a force, for example to sliding roofs or cargo hold covers of motor vehicles. In order to further simplify the production of the flexible shaft (1), the invention proposes providing a bore (5) in the catch (4), with an inner section (7), in particular an internal screw thread, corresponding to the spiral coil (3).

12 Claims, 5 Drawing Sheets

(58) Field of Classification Search
USPC .......................................................... 74/502.6
See application file for complete search history.

(56) References Cited

U.S. PATENT DOCUMENTS

| | | | |
|---|---|---|---|
| 4,402,160 | A | 9/1983 | Brusasco |
| 4,453,922 | A | 6/1984 | Glaser |
| 4,570,893 | A | 2/1986 | Ballantyne |
| 9,140,330 | B2 | 9/2015 | Rodenhauser |
| 2013/0291665 | A1 | 11/2013 | Rodenhauser |

FOREIGN PATENT DOCUMENTS

| | | |
|---|---|---|
| DE | 2659268 A1 | 7/1978 |
| DE | 2912666 A1 | 10/1979 |
| DE | 3015965 A1 | 5/1981 |
| DE | 102007041233 A1 | 3/2009 |
| DE | 102008005983 A1 | 8/2009 |
| DE | 102010015130 A1 | 10/2011 |
| DE | 102010055809 A1 | 6/2012 |
| DE | 102012110257 A1 | 4/2014 |
| EP | 2763838 B1 | 8/2014 |
| FR | 2482905 | 11/1981 |
| WO | 2012084082 A1 | 6/2012 |

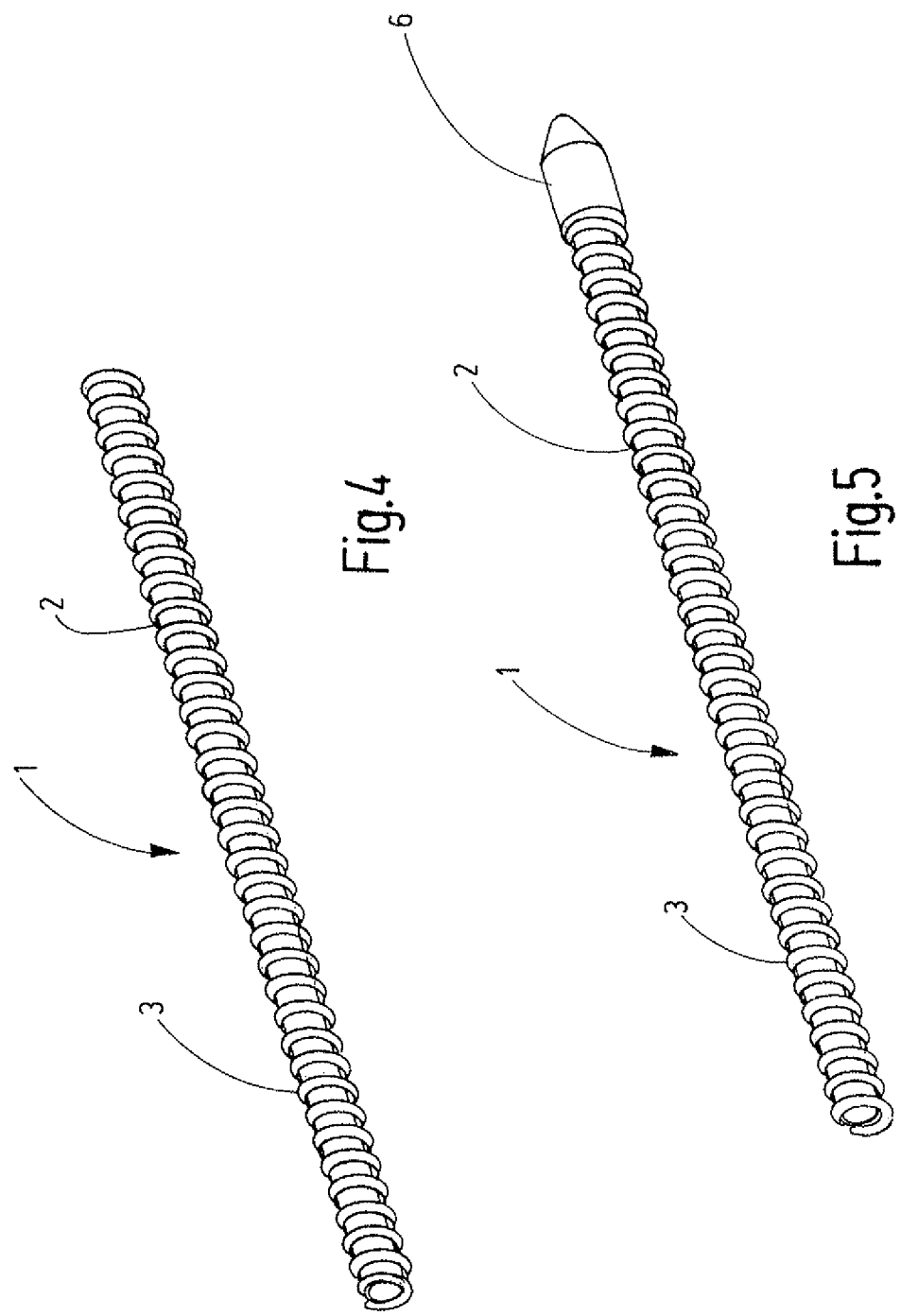

FLEXIBLE SHAFT WITH A CATCH AND METHOD FOR PRODUCING A FLEXIBLE SHAFT WITH A CATCH

CROSS-REFERENCE TO RELATED APPLICATIONS

This application is a national stage application (under 35 USC § 371) of PCT/EP2017/054690, filed Mar. 1, 2017, which claims benefit of German application No. 10 2016 104 918.2, filed Mar. 16, 2016, the contents of each of which are incorporated by reference herein.

BACKGROUND OF THE INVENTION

Technical Field and State of the Art

The invention relates to a drive cable having a catch that is attached to a section of the drive cable, especially at one end of the drive cable, in order to transmit force, for example, to sunroofs or cargo space covers.

Moreover, the invention relates to a method for the production of a drive cable, particularly for actuating sunroofs or cargo space covers of vehicles, whereby a catch is attached to a section of the drive cable, especially at one end of the drive cable, in order to transmit force, for example, to sunroofs or cargo space covers of vehicles.

Drive cables of the above-mentioned type, which are also known as helix cables or flexible drive shafts, are preferably employed for pop-up roofs and/or sunroofs, sun protection blinds and cargo space covers of motor vehicles. The drive cables can be moved axially, for instance, by means of a motor-driven worm gear, and are coupled via catches to a component that is to be adjusted, for example, to the sunroof, that is to say, the catches also serve to transmit force here. The drive cables are usually made of metal cables that consist of several strands and that have mounted helical coils in the form of a continuous product that subsequently has to be cut to the desired length. Here, both sides of the sunroof are attached to a catch of a drive cable. Structural configurations are also known in which two drive cables run around the contour of the sunroof to a shared drive where they engage with a toothed wheel that intermeshes with the coil spaces of the drive cable and that actuates the drive cables like a toothed rack.

The state of the art discloses catches on drive cables of the above-mentioned type which are configured as cast metal parts. German patent specification DE 10 2010 008 365 B4 describes a drive cable to whose one end a catch is attached which is configured to be coupled to a sliding element that can be moved in the axial direction of the drive cable. For this purpose, the catch is configured as a cast metal part which is cast around the end section of the drive cable, said catch having a lateral recess that is configured for the coupling and that is arranged beyond the end of the drive cable in the axial direction. This prior-art drive cable also has an axial-parallel pin that is cast into the cross section of the catch that remains next to the recess.

The state of the art also discloses catches for drive cables made of plastic and cast around the end section of the drive cable by means of an injection-molding process.

In German patent specification DE 36 07 724 C1, a sunroof and the drive cable are coupled to each other by a plastic part. In this context, a die-cast support is provided that is joined in one piece to parts of a carriage element. The die-cast support can be installed on a steel arm that is configured as a bent sheet metal part and that forms at least one crosspiece and one leg of the carriage element. The leg can likewise be an integral part of the bent sheet metal part. Preferably, however, the leg is formed by a plastic part that is connected to a steel arm and that allows a simple and effective anchoring to the drive cable by means of fusion using ultrasound. In order to achieve a firm bond between the guide carriage and the drive cable, the plastic part can preferably be softened by exposure to ultrasound in the area where it surrounds the drive cable in such a way that the material of the plastic part penetrates the interstices of the drive cable which consists, for example, of individual twisted wires.

A drawback of the drive cables known from the state of the art is especially the fact that, for each drive cable that is to be produced, the catch has to be cast around the end section of the drive cable by means of injection molding, which involves a considerable investment when it comes to achieving the requisite cost-effective serial production of the drive cables.

Moreover, it is disadvantageous that the catch has to be assembled manually.

Before this backdrop, it is one objective of the present invention to overcome these disadvantages.

SUMMARY OF THE INVENTION

The invention provides for a catch to have a bore in which an internal section, especially an internal thread, is formed that corresponds to the helical coil.

This structural configuration of the catch ensures that the catch can be configured or manufactured separately from the drive cable since the helical coil of the drive cable and the corresponding internal thread of the catch make it possible to screw the catch onto the end of the drive cable. Only after this process is the catch actually affixed. The catch is preferably manufactured as a free-falling injection-molded part, that is to say, it is manufactured by machine within the scope of serial production.

Preferably, the second end of the drive cable is provided with a sleeve cap that has a bore whose geometry or internal geometry differs from that of the bore of the catch.

It can also be provided that, before the end of the drive cable is connected to the sleeve cap, it is processed in such a way that the end is at least partially adapted to the corresponding receptacle of the sleeve cap.

In addition a method for the production of a drive cable is employed in which a catch is attached to a section or to one end of the drive cable, said method being characterized by the following steps:

a) production of a drive cable having a helical coil as well as production of a catch having a bore, whereby an internal section, especially an internal thread that corresponds to the helical coil, is formed inside the bore;

b) automated joining, especially screwing, of the catch to a section, especially to one end of the drive cable, or automated joining, especially screwing, of the drive cable into the bore of the catch; and c) fixation of the catch to the end of the drive cable.

In this process, the catch or the sleeve cap is preferably affixed by gluing and/or by fusing and/or by welding.

Another advantageous embodiment of the invention provides for the catch to be affixed by being heated, preferably by inductive heating. Preferably, the catch, which is advantageously made of plastic, is compressed after being heated. For this purpose, the catch can at first be screwed or twisted onto a section of the drive cable while still cold so that the catch can then be inductively heated. After this step, the catch is compressed within the range of a tenth of a millimeter against the drive cable by means of a compressing tool or a compressing device. This advantageously ensures that the catch and the drive cable cannot rotate with respect to each other.

In this process, the catch and/or the sleeve cap can be joined to the drive cable with a rotational (screwing) or linear motion.

The method according to the invention can advantageously be carried out in a completely automated process. The drive cable according to the invention and the method according to the invention for the production of the drive cable offer several additional advantages:

during the production of the drive cable, considerable savings can be achieved since the production of the drive cable can be carried out largely or completely automatically;

some de-burring finishing work can be dispensed with;

considerably lower costs are involved in the maintenance and upkeep of the tools;

warpage of the catch, especially in the area of the cable axis, is markedly improved or even prevented;

a more uniform quality of the part can be achieved by means of continuous production cycles;

ongoing process monitoring and data archiving are possible;

little or no soiling occurs, so that cleaning procedures during production can be largely eliminated.

For this purpose, it is also provided within the scope of an advantageous refinement of invention that the catch consists of an injection-molded plastic part.

Preferably, the internal thread is created by means of a casting process. This advantageously ensures that the plastic catch can be manufactured by machine as well as cost-effectively.

In a feasible variant of the invention, the drive cable is provided with flock filaments outside of the catch between the windings of the helical coil. The flocking is advantageously applied by winding in or fusing on flock yarn filaments which are made, for instance, of polyamide and which serve to reduce noise when the drive cable is moving. Such flock yarn filaments for drive cables are disclosed, for example, in international patent application WO 2009/030376 A1, German patent application DE 10 2007 041 233 A1 or German patent application DE 36 14 241 A1.

A very advantageous variant of the invention provides for the catch to be affixed to the drive cable. It is preferably affixed by means of an ultrasonic welding procedure, by gluing or by fusing.

In a preferred embodiment of the invention, the catch is configured as a metal-plastic part with a metal insert encapsulated by means of injection molding, thereby further increasing the stability of the catch.

Another advantageous embodiment of the invention provides for the second end of the drive cable to be provided with a sleeve cap. Such a sleeve cap is described in German patent application DE 10 2008 005 983 A1. The drive cables, which have been cut to the right length, tend to fray due to the loose individual wires of the cable. Another problem of the prior-art drive cable is that, in the mounted state, they tend to rattle at the ends. The provided sleeve cap avoids these drawbacks. Preferably, the sleeve cap has a bore whose wall, in turn, has a shape that corresponds to the helical coil.

The sleeve cap is attached or affixed to the end of the drive cable automatically, for example, by means of ultrasonic welding, by gluing or by fusing.

Another method for the production of the drive cable with the sleeve cap has the following method steps:

a) production of a drive cable having a helical coil as well as production of a sleeve cap having a bore, whereby a shape that corresponds to the helical coil is created inside the bore;

b) automated joining of the sleeve cap to a section, especially to one end of the drive cable, or else automated joining of the drive cable in the bore of the sleeve cap;

c) fixation of the sleeve cap to a section, especially to the end of the drive cable.

In a preferred variant, the section of the drive cable where the catch or the sleeve cap is to be attached is inductively heated before the catch and/or the sleeve cap is mounted. As an alternative, the drive cable can also be heated up after the catch has been mounted. When the drive cable and the catch and/or the sleeve cap are being joined, this area is melted or fused or welded.

In this context, in order to affix the catch, only a partial area of the section of the drive cable that is to be screwed in is heated up. This prevents the catch from being deformed excessively. An undesired or excessive deformation of the catch can occur if the entire screwing length of the drive cable is heated up.

If, for example, a screwing depth of 30 mm is prescribed, then before the catch is mounted onto the drive cable, only the section of, for example, 20 mm to 30 mm starting from one end of the drive cable is heated up inductively, that is to say, in this preferred variant, the end section of the drive cable, for instance, 20 mm at the end of the drive cable, is not heated up, but rather, only, for instance, the 10 mm located at a distance from one end of the drive cable in the area of 20 mm to 30 mm are heated up. This also advantageously prevents deformation of the catch.

The drive cable and the catch and/or the sleeve cap are melted or fused in order to affix the catch and/or the sleeve cap to the drive cable.

The strength of the bond between the drive cable and the catch or the means that prevents them from being pulled apart is achieved by the screwed connection between the drive cable and the catch.

A feasible variant of the invention provides that the sleeve cap is affixed to the drive cable.

In this context, it can be provided that, before the end of the drive cable is joined to the sleeve cap, it is processed in such a way that the end, the end section or the tip of the drive cable is adapted so that it can be joined to the sleeve cap. For instance, the shape of the end of the drive cable can be at least partially adapted to the corresponding receptacle in the sleeve cap.

For example, only the end section or the tip of the drive cable, which is preferably shaped conically by grinding, e.g. at an angle of 10° to 30°, preferably 15°, between the axis and the outer wall of the cable, is inductively heated up in order to be affixed.

Preferably, the sleeve cap has a bore having a congruently configured shape.

A sleeve cap that is preferably made of plastic is mounted on the thus-prepared end section of the drive cable, so that it can be affixed by fusing the sleeve cap onto the end of the cable.

According to another advantageous embodiment of the invention, ribbing or knurling can be created at the end of the drive cable in order to enhance the strength of the bond.

Additional objectives, advantages, features and application possibilities of the present invention ensue from the description below of embodiments with reference to the figure. In this context, all of the described and/or depicted features, either on their own or in any meaningful combination, constitute the subject matter of the present invention, also irrespective of their compilation in the claims or the claims to which they refer back.

DESCRIPTION OF THE DRAWINGS

The following is schematically shown:

FIG. 4 a perspective view of a drive cable that has been cut to the right length;

FIG. 5 a perspective view of another step within the scope of the method according to the invention.

DETAILED DESCRIPTION

Figure 1:
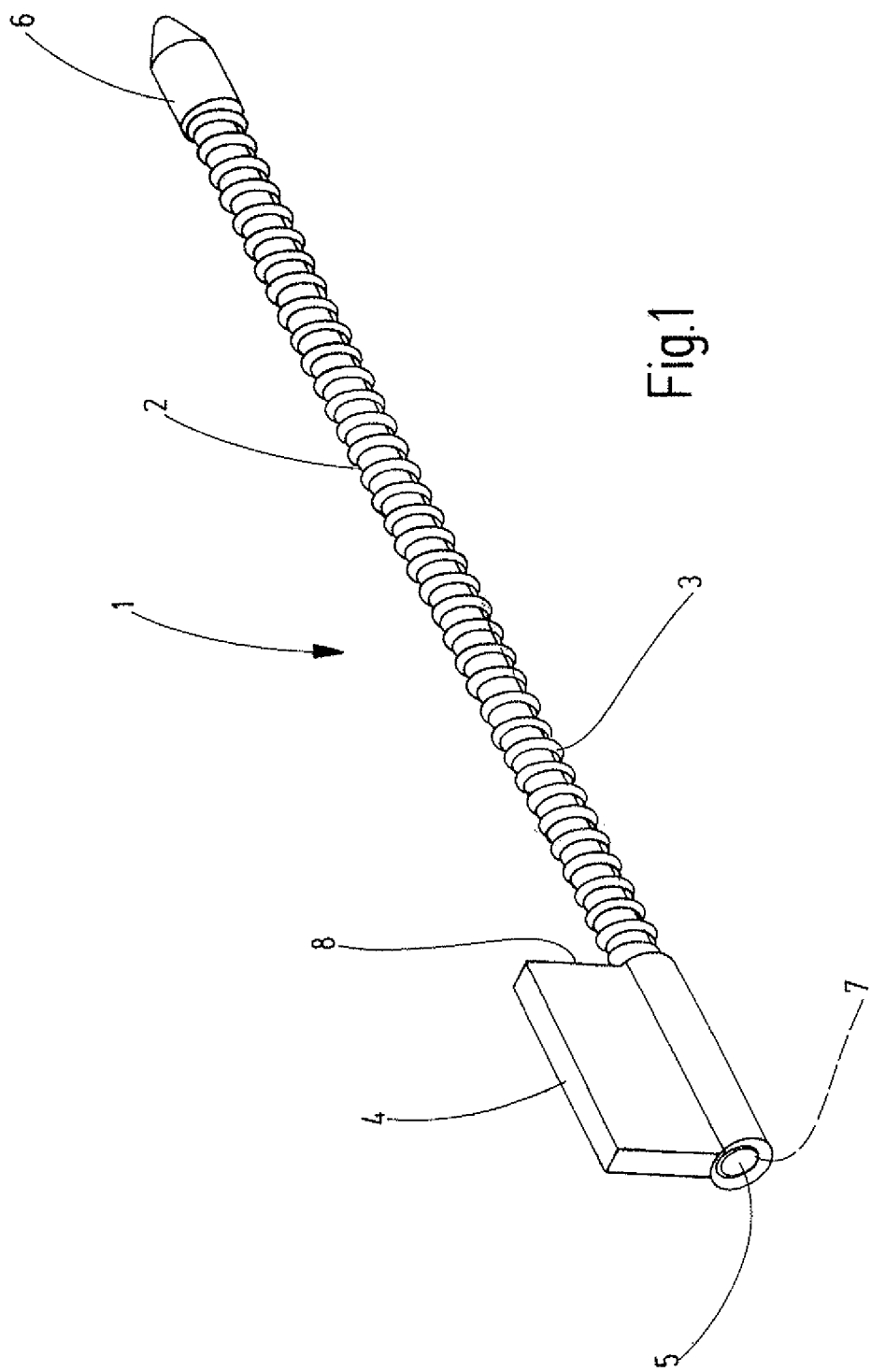
FIG. 1 a perspective view of a drive cable according to the invention.

FIG. 1 shows a drive cable, which is designated by the reference numeral 1.

The drive cable 1 has a core 2 which, in the embodiment selected here, consists of wires made of metal or plastic and wound in opposite directions over each other in several layers.

As can be also seen in FIG. 1, a helical coil 3 made of wire is wound onto the core 2.

As is also shown in FIG. 1, the end of the drive cable 1 is provided with a catch 4. The catch 4 is affixed to the drive cable 1 and it has a bore 5 in which an internal section 7 in the form of an internal thread is formed that corresponds to the helical coil 3 shown in FIG. 2. The internal section 7, at the same time, constitutes the wall of the bore 5.

FIG. 1 also shows that the second end of the drive cable 1 is provided with a sleeve cap 6 that forms the closure of the drive cable 1 and that is attached to the drive cable 1. The sleeve cap 6 has been mounted on the drive cable 1 by means of an automated process.

Figure 2:
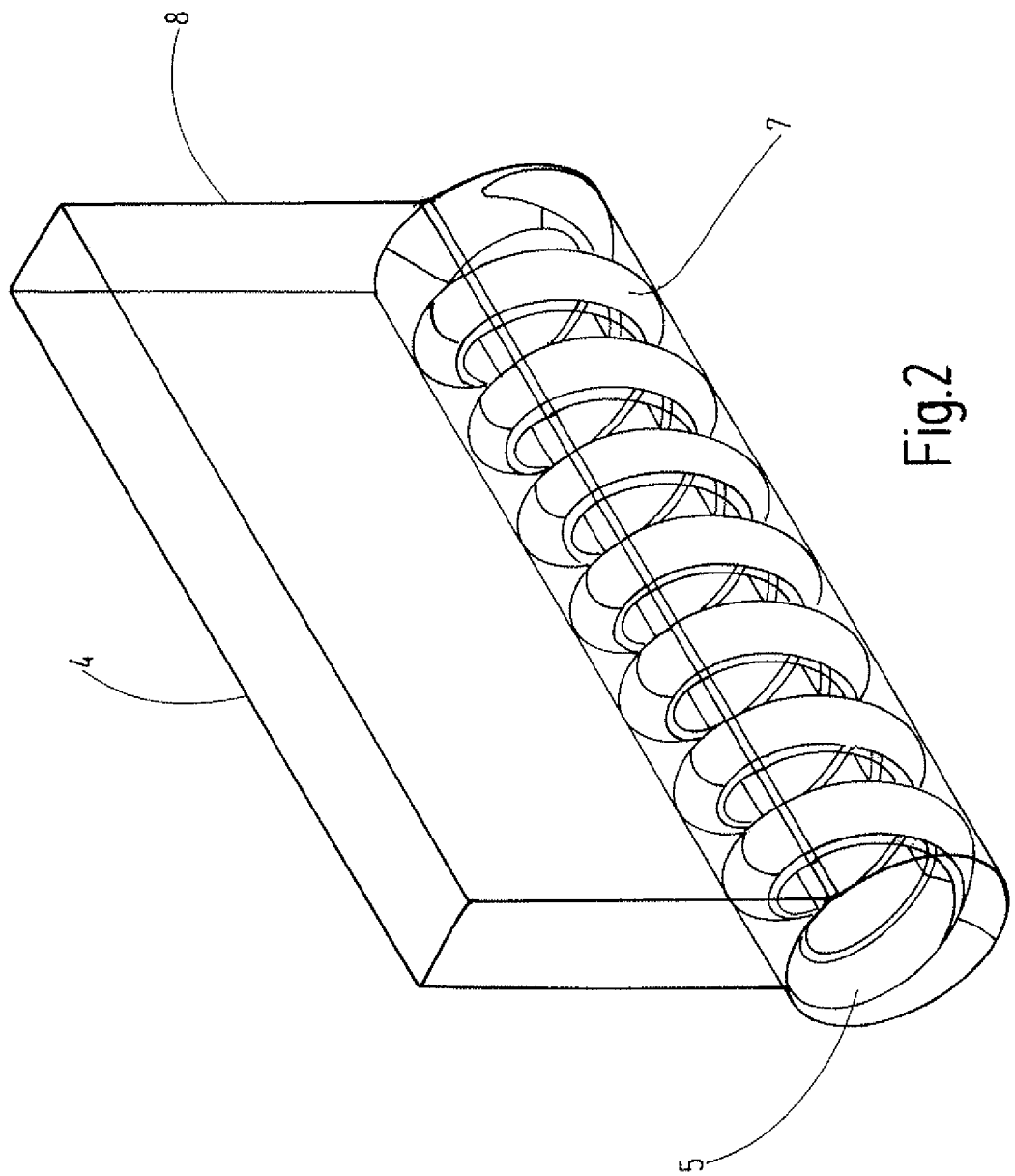
FIG. 2 a perspective view of the catch according to the invention, on the drive cable shown in FIG. 1.

The catch 4 shown in FIG. 2 is provided with a surface element 8 which, projecting from the catch 4, serves to couple the catch to a movable sliding element such as, for example, the sunroof of a motor vehicle. As is also shown in FIG. 2, the catch 4 has the internal section 7, which is in the form of an internal thread and configured as a cast part. Moreover, the catch 4, as an injection-molded part, is formed separately from the drive cable 1 shown in FIG. 1, that is to say, the catch 4 shown in FIG. 1 is initially not an integral part of the drive cable 1 and is separate from the drive cable 1.

Figure 3:
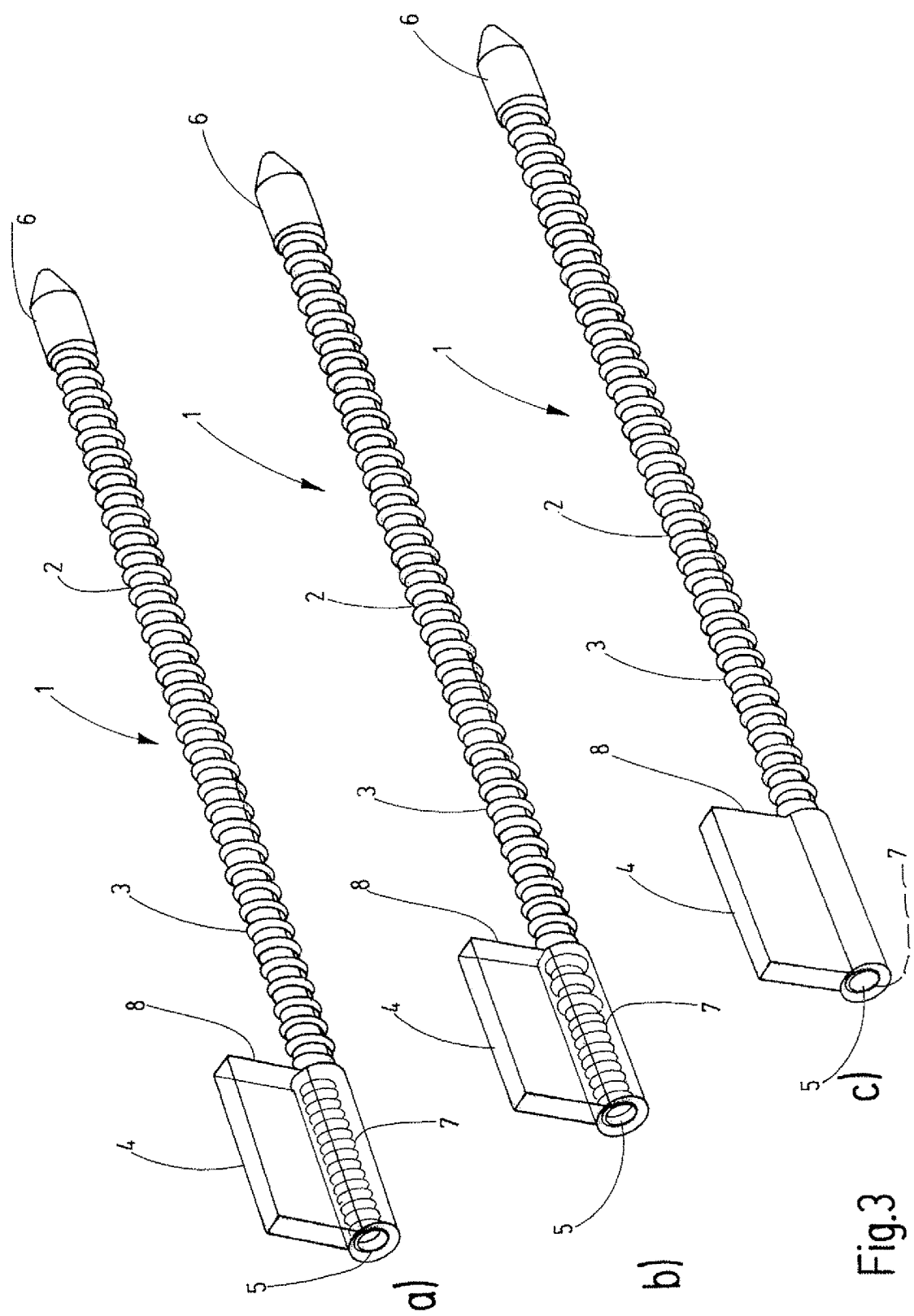
FIG. 3 a perspective view of the sequence of the method (steps a), b) and c)) according to the invention.

The drive cable 1 and the catch 4 are connected and joined within the scope of the method according to the invention, whose sequence is illustrated in FIGS. 3a to 3c.

The method starts with the production of a drive cable 1 having a helical coil 3 as well as with the production of a catch 4 having a bore 5, whereby an internal section 7, which is in the form of an internal thread and which corresponds to the helical coil 3, is formed inside the bore 5.

As can be seen in FIG. 3a, the catch 4 is initially not an integral part of the drive cable 1 and is separate from it. The catch 4 shown in FIG. 3a is manufactured as a free-falling injection-molded part.

In another step, as illustrated in FIG. 3b, the drive cable 1 is screwed into the catch 4. This is achieved by means of the helical coil 3 and the internal section 7 of the catch 4, said internal section 7 corresponding to the helical coil 3 and being in the form of the internal thread.

Finally, within the scope of another method step, which is illustrated in FIG. 3c, the catch 4 is affixed to a section of the drive cable which, in FIG. 3c, is one end of the drive cable 1. It is affixed by means of an ultrasonic welding process, by gluing, by fusing or by welding.

Additional steps are integrated into the method according to the invention. FIG. 4 shows that, during the production of the drive cable 1, namely, starting with an endless drive cable, the latter is first cut to the right length, that is to say, before the catch 4 shown in FIGS. 3a to 3c is mounted and affixed. Once the drive cable has been cut to the right length, the sleeve cap 6 can be automatically mounted onto one end of the drive cable 1, as illustrated in FIG. 5.

Figure 6:
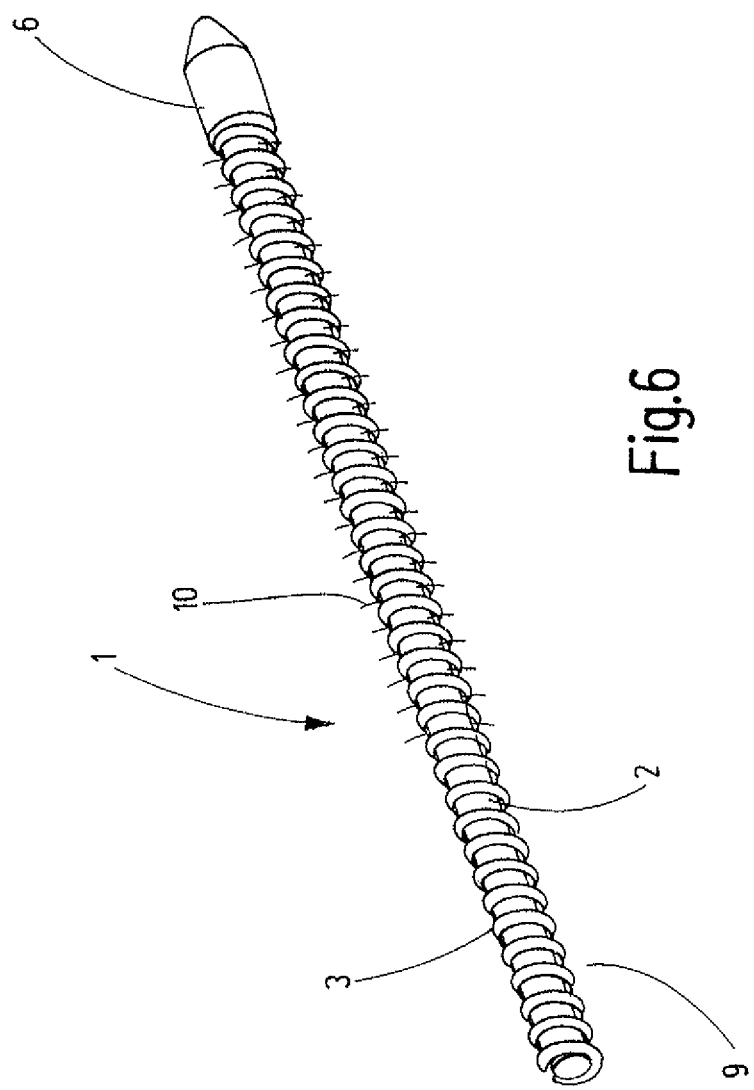
FIG. 6 a perspective view of another step within the scope of the method according to the invention.

As is shown in FIG. 6, the drive cable 1 outside of the catch 4 is wrapped in flock yarn filaments 10 between the windings of the helical coil 3, thereby preventing noise during the movement of the drive cable 1. The flock filaments 10 are removed in the section 9 where the catch 4 is mounted.

The present invention is not restricted in terms of its configuration to the embodiments presented here. Rather, several variants are conceivable which make use of the solution presented here, even in the case of other types of configurations. It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

LIST OF REFERENCE NUMERALS 1 drive cable/flexible shaft
2 core
3 helical coil/spiral coil
4 catch
5 bore
6 sleeve cap
7 internal section/inner section
8 flat element
9 catch section
10 filaments

The invention claimed is:

1. A drive cable (1) for a sunroof or cargo space cover of a vehicle, comprising:
  a helical coil (3) mounted onto a core (2) of the drive cable (1); and
  a catch (4) that is arranged on a section of the drive cable (1), the catch (4) having a bore (5) in which an internal thread (7) is formed that corresponds to the helical coil (3), wherein the catch (4) is affixed to the drive cable (1) by an attaching means selected from the group consisting of: gluing, fusing, welding and a combination thereof.

2. The drive cable according to claim 1, wherein the catch (4) is made as an injection-molded plastic part.

3. The drive cable according to claim 1, wherein the internal section (7) is created by means of a casting process.

4. The drive cable according to claim 1, wherein the drive cable (1) has a first end and a second end, and the catch (4)

is attached at or near the first end, and the second end of the drive cable is provided with a sleeve cap (6).

5. The drive cable according to claim 4, wherein the sleeve cap (6) has a bore whose wall has a shape that corresponds to the end of the helical coil (3).

6. The drive cable according to claim 4, wherein the second end of the drive cable is processed before being joined to the sleeve cap.

7. A method for making a drive cable (1) for transmitting force to a sunroof or a cargo space cover of a vehicle, comprising:
- a) producing a drive cable (1) having a helical coil (3) mounted on the drive cable, and producing a catch (4) having a bore (5), wherein an internal threaded section (7) formed inside the bore (5) corresponds to the helical coil (3);
- b) joining the catch (4) to the drive cable (1), or screwing the drive cable (1) into the bore (5) of the catch (4); and
- c) affixing the catch (4) to the drive cable (1), wherein affixing is selected from the attaching means selected from the group consisting of: gluing, fusing, welding and combinations thereof.

8. The method according to claim 7 wherein the catch (4) is compressed after being affixed.

9. The method according to claim 7 wherein the catch (4) is made by means of an injection-molding process.

10. The method according to claim 7 wherein the drive cable (1) has a first end and a second end, and the catch (4) is affixed at or near the first end, and a sleeve cap (6) is mounted onto the second end of the drive cable (1).

11. A method for making a drive cable (1), comprising:
- a) providing a drive cable (1) with a helical coil (3) around at least a portion of the drive cable;
- b) providing a sleeve cap (6) with a bore (5), wherein a shape that corresponds to the helical coil (3), is formed inside the bore (5);
- c) joining the sleeve cap (6) to one end of the drive cable (1), or joining the drive cable into the bore of the sleeve cap (6); and
- d) affixing the sleeve cap (6) to the drive cable (1), wherein affixing is selected from the attaching means selected from the group consisting of: gluing, fusing, welding and combinations thereof.

12. The method according to claim 11, wherein the one end of the drive cable (1) is processed before being joined to the sleeve cap.

\* \* \* \* \*